United States Patent [19]

Mikulic

[11] 4,190,794
[45] Feb. 26, 1980

[54] ALTERNATING CURRENT MOTOR WITH ADJUSTABLE OUTPUT TORQUE BY MEANS OF ADJUSTABLE MAGNETIC BARS

[76] Inventor: Kreso Mikulic, 1634 Crest Hill, Cincinnati, Ohio 45237

[21] Appl. No.: 888,331

[22] Filed: Mar. 20, 1978

[51] Int. Cl.² .............................................. H02P 7/08
[52] U.S. Cl. .................................... 318/831; 310/191; 310/214
[58] Field of Search ....................... 318/831, 830, 832; 310/190-193, 166, 209, 214

[56] References Cited
U.S. PATENT DOCUMENTS

| 761,682 | 6/1904 | Javaux et al. ......................... 310/191 |
| 1,776,153 | 9/1930 | Kinnard ................................ 318/831 |
| 4,025,840 | 5/1977 | Brissey et al. .................... 310/190 X |

Primary Examiner—Donovan F. Duggan
Attorney, Agent, or Firm—Frost & Jacobs

[57] ABSTRACT

Alternating Current (A.C.) Motors are modified in such a way as to provide zero to full nameplate torque, by inserting magnetic rods into elongate control-rod-receptive channelways in the stator. By moving the rods in and out of their respective channelways the magnetic path of the stator flux will change. With the rods all the way out of the stator full nameplate torque is achieved. As the rods are inserted deeper into the stator, the output torque of the rotor will decrease proportionally to a minimum value.

12 Claims, 6 Drawing Figures

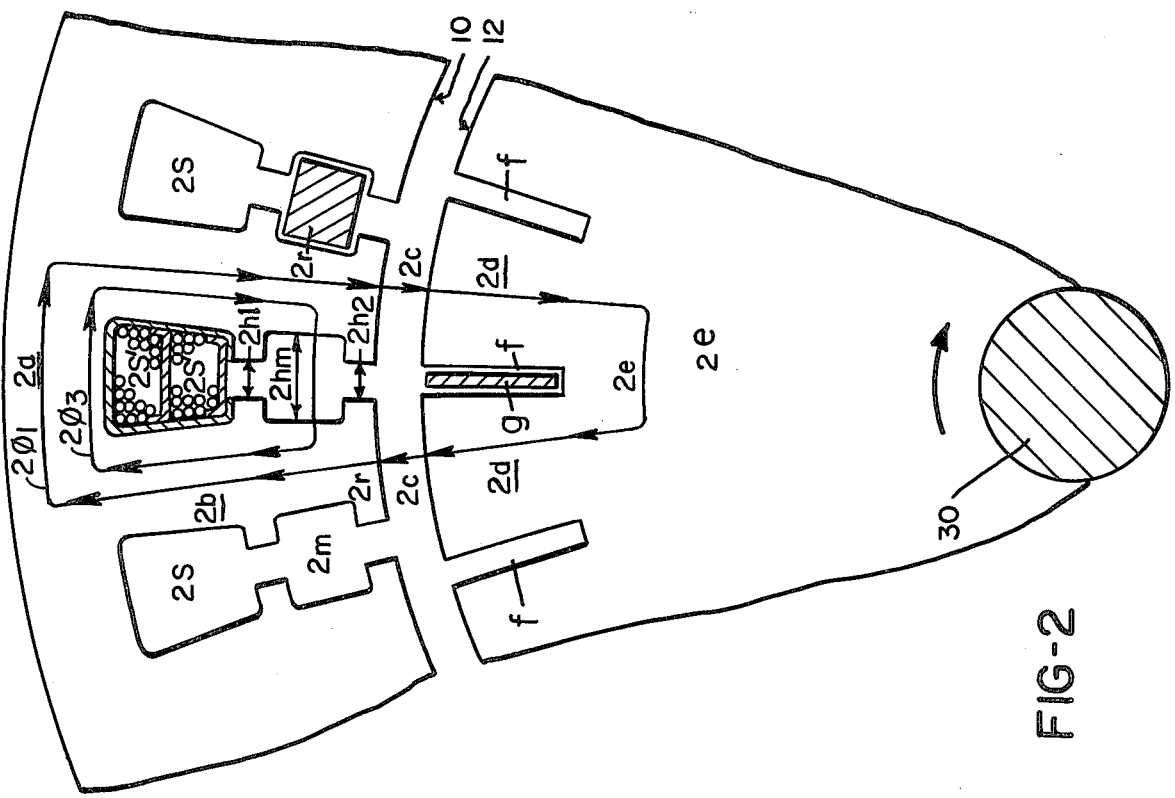
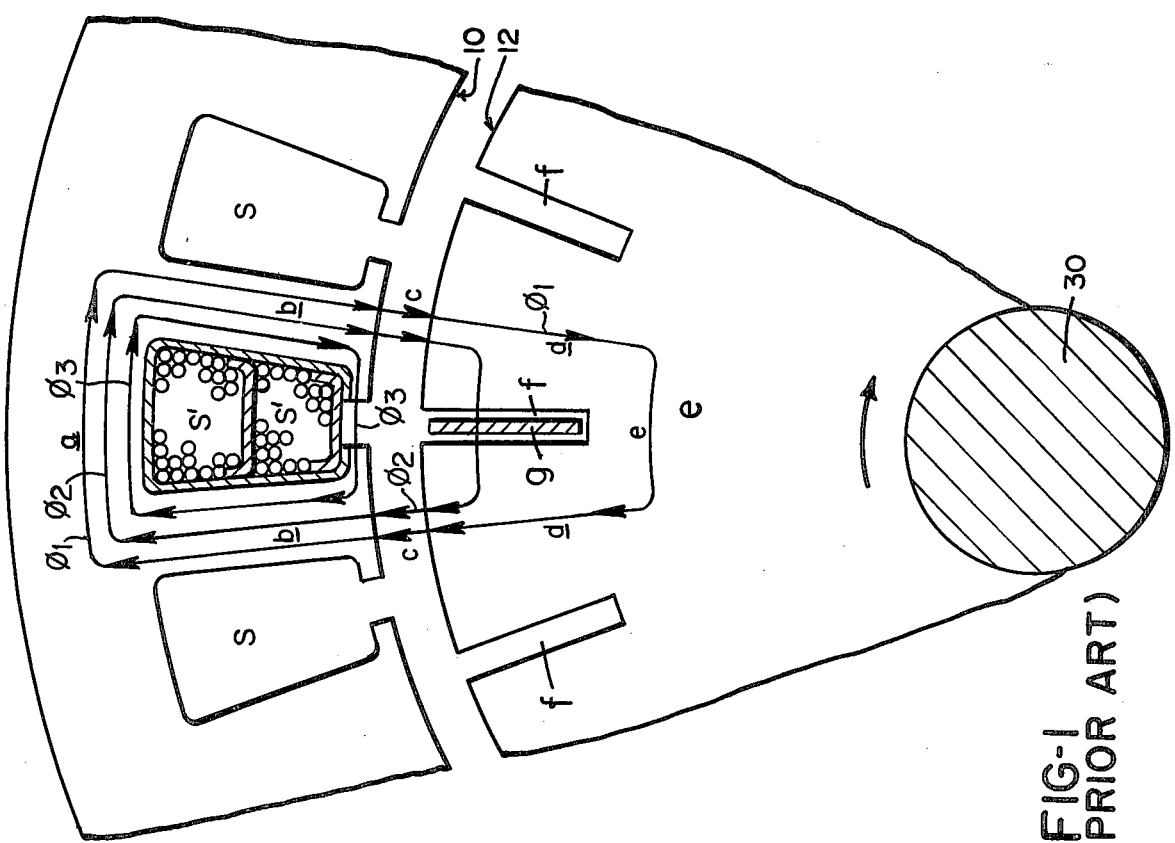
FIG-2
FIG-1 (PRIOR ART)

4,190,794

ALTERNATING CURRENT MOTOR WITH ADJUSTABLE OUTPUT TORQUE BY MEANS OF ADJUSTABLE MAGNETIC BARS

BACKGROUND OF THE INVENTION

1. Field of the Invention

The field of the invention is directed to the provision of a simple yet highly effective method of and means for providing A.C. motors with an infinitely adjustably output torque within the limits of zero to full nameplate rating.

2. Description of the Prior Art

Applicant is aware of the following patents which, in his opinion, are most relevant to the subject invention.

U.S. Pat. No. 2,748,334 to G. L. Miller dated May 29, 1956 discloses two variants of a VARIABLE SPEED INDUCTION MOTOR wherein means are provided for imparting endwise axial movement to the stator 26 relative to the outer periphery of rotor 12 for selectively varying the amount of magnetically responsive flux introduced into the magnetic field at any time by the stator. The rotor is provided with a first portion 18 and a second portion 20 wherein the portion of the circumference of portion 22 is cut away at 26 to provide an annular groove or gap which completely encircles the periphery of portion 22. This reference in FIGS. 4-7 also illustrates means whereby the rotor, per se, is mounted for endwise axial movement relative to the stator which is fixedly mounted relative to the inner surfaces of the motor housing.

The change in the axial relationship of the axially shiftable stator relative to the axially fixed rotor, or the change in the axial relationship of the axially displacable rotor relative to the axially fixed stator is utilized to alter the path for the stator flux in such a manner as to achieve a change in output speed of the rotor. The invention of the subject application is distinguishable from the disclosure of this reference since in applicant's device both the rotor and the stator are at all times fixed against a relative axial movement, and control of the flux is accomplished by advancing or retracting magnetic control rods axially into and out of control-rod-receptive channels provided through the stator.

U.S. Pat. No. 2,959,694 dated Nov. 8, 1960 discloses an ADJUSTABLE SPEED SQUIRREL CAGE INDUCTION MOTOR of the type which includes a stator which is axially shiftable relative to and along the length of the rotor for thereby altering the path of the stator flux to the rotor to control the rotational speed of the rotor wherein the rotor includes a low resistance induction section 19 which is disposed adjacent and in axial alignment with a high resistance induction section 20. The stator element 22 is provided with conventional polyphase windings 23 said stator being longitudinally slideable internally of the motor frame relative to the outer periphery of the rotor.

The operation of U.S. Pat. No. 2,959,694 is described in column 4, lines 24-50 as follows:

"In operation, at start, with the stator 22 over only the nondriving, noninductive rotor section 21, the latter provides a magnetic body of low reluctance acting as a shunting element for the stator field to maintain a high counter electromotive force in the stator winding and avoid undue current drain on the line. To start rotation of the rotor at low speed, the reversible control motor 33 is operated to move the stator from right to left (FIG. 1), gradually bringing the stator over the high resistance rotor section 20 to give the motor high starting torque with high slip and low current drain from the line. Then further operation of the control motor 33 to move the stator on over the low resistance section 19, further reduces the effective resistance of the combined driving rotor sections 19 and 20 gradually bringing the motor to a characteristic giving low slip and substantially constant speed with load changes."

"To reduce speed or bring the motor to a stop, the control motor 33 is reversed; moving the stator back toward the nondriving, rotor section until the desired reduction in motor speed is obtained, or all the way to the nondriving section if stoppage is desired. Intermediate positions of the stator will give intermediate speeds which may be maintained for a considerable time without undue heating due to the effective cooling system for dissipating heat generated in the windings, particularly the high resistance winding."

U.S. Pat. No. 4,025,840 to G. E. Brissey et al dated May 24, 1977 discloses a PERMANENT MAGNET GENERATOR WITH OUTPUT POWER ADJUSTMENTS BY MEANS OF MAGNETIC SHIMS which are designated by the numeral 11 and which, as clearly illustrated in FIGS. 1 and 3, are disposed in fixed, overlying relationship with the outer surface of nonmagnetic insulated wedges 24 which in turn overlie the upper portions of the slot liners 23 which encapsule coils 20, 21, and 22 wound around the pole stems located in compartments which are disposed in slots 12 between adjacent teeth 13 which extend radially from yoke 14 of the stator. The stator teeth 13 are of the salient or overhanging type and include a pair of oppositely extending salient tip portions 15. Magnetic shims 11 are inserted endwise into one or more of a plurality of the stator slots 12 being wedged beneath overhanging portions 15 of the stator teeth and the upper surface of the insulating wedge 24 after which the triangular ends 26 of the magnetic shims (not FIG. 2) are turned upward for engaging the opposite ends of tip portions 15 of a stator tooth 13 to thereby effectively prevent the endwise removal of a shim until and unless an upturned end 26 thereof has been bent downwardly back to the plane of the shim, per se, after which it may be slid endwise from between adjacent teeth 13.

This reference teaches that by the judicious selection and placing of shims in certain specific selected slots of the stator, the flux leakage between the stator and rotor at the location of the shims may be increased whereby the leakage inductance of the windings in those slots in which the shims have been placed will, under increased load, reduce the output from the selected windings without in any way effecting the output from the other windings of those particular slots which have not been provided with a magnetic shim strip 11.

U.S. Pat. No. 2,342,720 dated Feb. 29, 1944 to J. H. Blankenbuehler discloses a WELDING GENERATOR wherein the reluctance of the path of the magnetic leakage flux between the arcuate shoe member 19 and 20 and the field pole members 11 and 12 are selectively varied by means of a movable magnetic shunt member 34 which is positioned in bridged relation between the adjacent portions of the shoe members 19 and 20 and wherein the movable shunt member 34 is suitably mounted for endwise axial movement relative to said pole members, thereby changing the output welding current as delivered by the generator.

Abstract #209,189 published Apr. 21, 1953, of H. K. Ziegler discloses an ALTERNATING CURRENT MACHINE which has a stationary armature 33 with a winding thereon, a rotor 21 for producing a permanent magnetic field, and a housing 30. A laminated soft iron ring-shaped magnetic shunt member is supported coaxially of the rotor shaft 28 and is adjustably attached to the housing 30 and/or the rotor shaft 28. The ring-shaped magnetic shunt is adjustable axially of the rotor shaft by means of a suitable mechanism in order to vary the amount of flux from the permanent magnet rotor which links both the rotor and the armature winding. If desired a damper winding 27 may also be provided.

U.S. Pat. No. 978,638 to C. A. Parsons et al dated Dec. 13, 1910 relates to REGULATION OF DYNAMO ELECTRIC MACHINERY wherein the A.C. output voltage of a polyphase A.C. generator is regulated by providing a secondary winding for the leakage path of the flux.

U.S. Pat. No. 1,231,588 to L. T. Frederick et al dated July 3, 1977 discloses MAGNETIC MATERIAL from which magnetic shims are produced for reducing the eddy current loss in a stator or rotor by narrowing the air gap in the stator or rotor slot openings. The composite shim material is composed of both nonmagnetic and magnetic material.

Applicant is also aware of the disclosure of German Pat. No. 817,008 310/190—German Pat. No. 233,235 310/190—and German Pat. No. 159,241 310/190, and he is also aware of U.S. Pat. No. 3,226,582 to S. Beckwith dated Dec. 28, 1965 which discloses ADJUSTABLE TORQUE INDUCTION MOTORS and U.S. Pat. No. 3,042,820 dated July 3, 1962 to A. Diamond which discloses a SERVO MOTOR WITH ADJUSTABLE VELOCITY DAMP. However, it is considered that none of the last 5 mentioned references are as relevant as any of the first seven mentioned references, the disclosures of which have been more fully discussed hereinabove.

The disclosure of none of the 12 aforementioned references when considered singly or in combination neither teach nor disclose the inventive concept for accomplishing the concept of torque control of an alternating motor as disclosed in this application, nor is the invention of this application obvious, as that term is used in U.S. C. Title 35, Section 103.

BRIEF DESCRIPTION OF THE DRAWINGS

FIG. 1 is a partial end view partly in section illustrating the relationship between the stator and rotor of a typical, or conventional, A.C. motor, showing the path of magnetic flux between the stator to the rotor.

FIG. 2 is a view generally similar to FIG. 1 but from which it differs in that it illustrates and embodies the inventive concept of the present invention.

DETAILED DESCRIPTION OF THE INVENTION

By way of background, and with particular reference to FIG. 1, the relationships between the stator and the rotor of a conventional electric A.C. motor have been illustrated as representing prior art, wherein the letter a designates the stator yoke; S stator slots in the yoke in which slots the primary windings S' of the stator are housed; b stator teeth which are disposed between adjacent stator slots; c the air gap between the adjacent peripheral surfaces 10 and 12 of the stator yoke a and the rotor yoke e. Rotor yoke e is provided with a plurality of circumferentially spaced U-shaped rotor teeth d which are defined by open ended slots f which are open at their outer ends to air gap c, and each of slots f house a rotor bar g.

Figure 6:
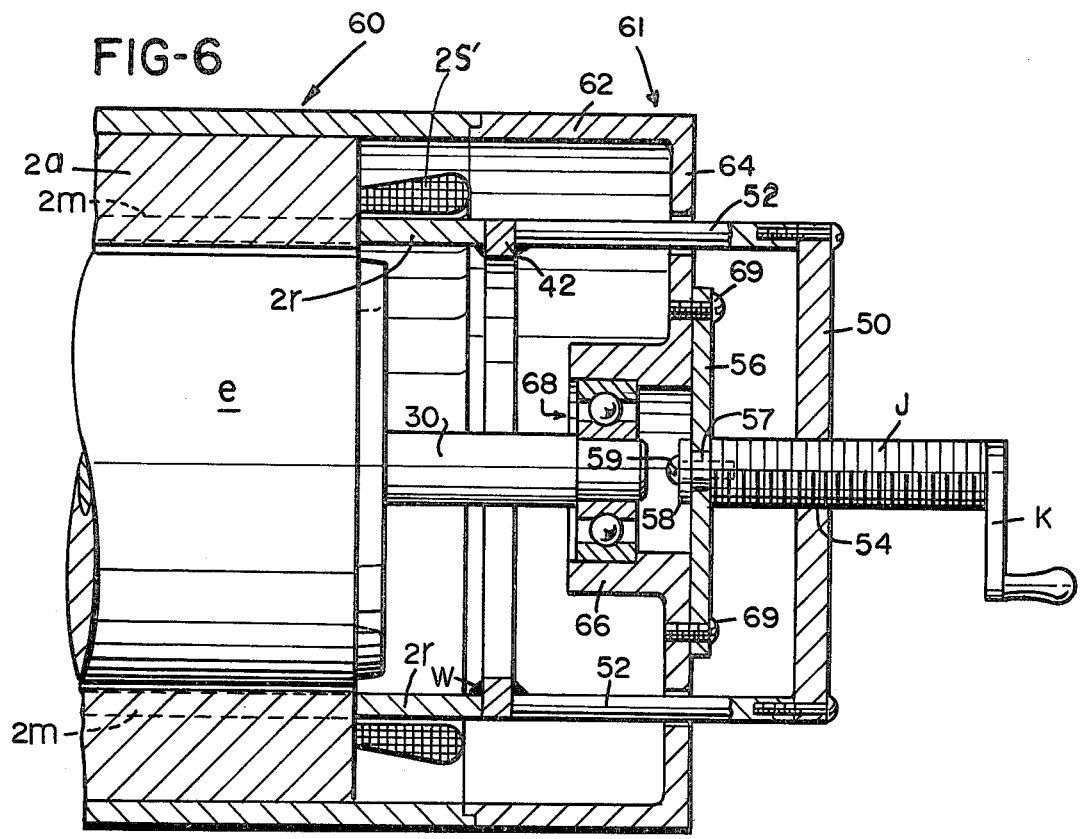
FIG. 6 is a vertical sectional view through one end-adjacent portion of a typical A.C. motor, the housing of which has been extended to accommodate the overall length of endwise, axial travel of the torque-control-rods of FIG. 5 in their respective elongate channelways through the stator, and which further illustrates manually operable means for selectively advancing or retracting the control rods relative to the stator.

The stator a is suitably anchored by any suitable means, not illustrated, relative to the interior of the motor housing 60, FIG. 6, whereas the rotor yoke e is secured to and carried by a drive shaft 30 the opposite ends or end-adjacent portions of which are rotatably mounted in bearings. It should be understood that one end of shaft 30 projects axially from and beyond an end of the motor housing as conventional in electric motors.

It should be understood that for ease of understanding only one of the slots of the stator and rotor have been provided with coils, and magnetic members are associated with all of the slots S and f.

FIG. 1 illustrates the flux path between the stator and rotor of the conventional or prior art A.C. electric motors.

Classical theory states that the magnetic flux originating in the stator windings S' of an A.C. motor provides a magnetic coupling with rotor bars g, and that flux which does not penetrate the air gap c does not contribute to turning torque of the rotor.

Referring again to FIG. 1 it will be noted and understood that the lines of flux indicated by $\phi_1$ and $\phi_2$ contribute to rotor torque, it being noted that the output torque of the rotor is proportional to the square of this flux density, whereas lines of flux $\phi_3$ do not contribute to rotor torque.

The most widely used methods of reducing flux $\phi_1$ for providing reduced starting current, reduced torque, or reduced speed has been to reduce the primary, that is the stator winding voltage by means of an auto transformer, solid state SCR Controller or some other suitable voltage reducing device.

The present invention, as illustrated in FIG. 2, relates to a method of and means for selectively changing the proportion of the flux of $\phi_1$ and $\phi_3$ without changing the applied stator voltage. Maximum torque in rotor shaft 30 is accomplished when $\phi_1$ is a maximum and $\phi_3$ is minimum, and conversely minimum torque is accomplished when $\phi_1$ is minimum and $\phi_3$ is maximum.

In FIG. 2 the overall shape of the stator slots are defined by an inner channelway 2m and a radially spaced outer channelway 2S, and a pair of air gaps $2h_1$ and $2h_2$, wherein air gap $2h_1$ is narrower than and extends between said inner and outer channelways, and wherein inner air gap $2h_2$ is narrower than and extends between said inner channelway to the inner periphery 10 of the stator in open communication with air gap $2c$ between the adjacent surface 10 and 12 of stator and rotor.

Torque control rods $2r$ fabricated from magnetic material are dimensioned to make a snug, but slip fit with the interior of the inner channelways $2m$, said rods being of an overall length whereby to extend the full length of the inner channelways when disposed in a fully advanced position within and relative to the stator yoke.

Since the magnitude of the flux $\phi_1$, $\phi_2$, and $\phi_3$ of FIG. 1 and $2\phi_1$ and $2\phi_3$ of FIG. 2 are dependent upon their respective path resistance, the highest flux resistance is defined by the air gaps c and $2c$.

In FIG. 2 the outer channelway 2S is provided with turns or windings 2S'. The inner channelway $2m$ may be empty, in which event it constitutes part of an overall air gap $2h_1$, $2hm$, and $2h_2$, or said inner channelway may be partially or completely filled with a magentic rod $2r$.

In order to change the relationship of flux $2\phi_1$ to flux $2\phi_3$ the magnetic flux path resistance is changed by moving rods $2r$ in their respective channelways. With the rods withdrawn the air gap of $2\phi_3$ is defined as $2h_1$, plus $2hm$ plus $2h_2$, whereas flux $2\phi_1$ has but two air gaps, viz $2c$. Therefore, with the inner channelways empty the magnetic path of flux $2\phi_3$ has a substantially greater resistance than the magnetic path of flux $2\phi_1$ and maximum turning torque will be applied to the rotor.

However, with the inner channelways filled with magnetic rods $2r$, the magnetic path of flux $2\phi_3$ has a lower magnetic resistance than flux path $2\phi_1$ and the output turning torque of the rotor will be a minimum because the flux is, in effect, short circuited through said rods.

Figure 3:
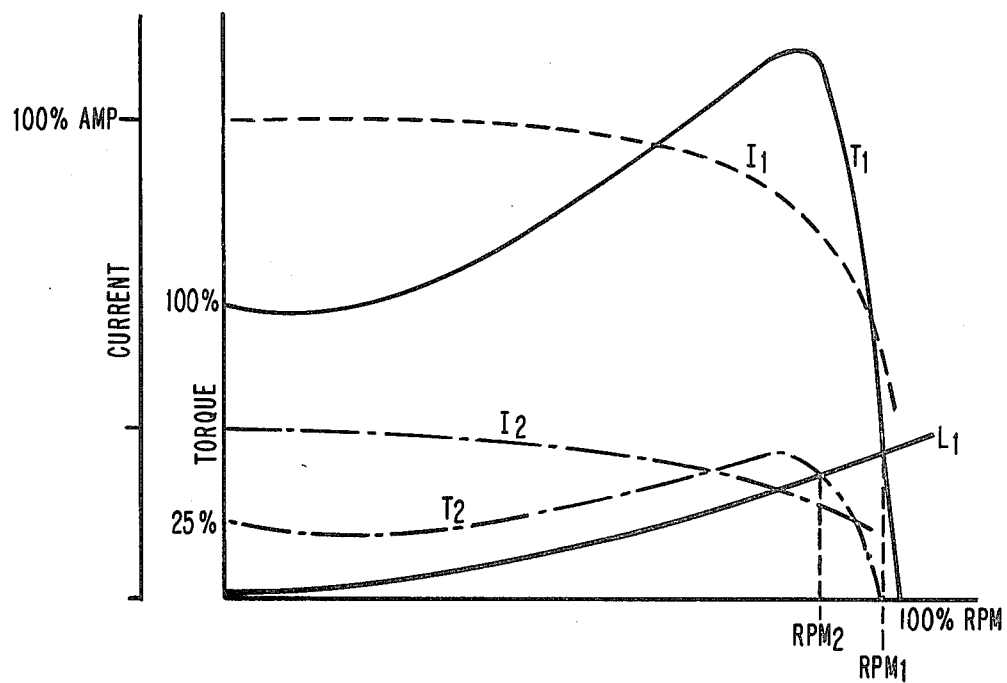
FIG. 3 graphically illustrates the relationship between current-torque and the rotor r.p.m. of an A.C. motor which embodies the teachings of the present invention.

In FIG. 3 curve $T_1$ is a typical Nema curve as occurs when flux $2\phi_1$ is at a maximum.

If the flux $2\phi_1$ is reduced by one-half by inserting the magnetic rods $2r$ into the inner channelways of the stator the torque of the motor rotor will be reduced to one-quarter of maximum torque $2\phi_1$ as indicated by curve $T_2$.

It has also been established that whenever flux $2\phi_3$ and $2\phi_1$ are equal, in FIG. 2, the output turning torque of the rotor will be one-quarter rated torque of the motor.

FIG. 3 further discloses that the maximum torque $T_1$ has a corresponding maximum starting current $I_1$, and the relative values of starting current $I_2$ for torque $T_2$ has been indicated.

With the magnetic control rods $2r$ inserted longitudinally into their respective inner channelways $2m$ to a point where the flux $2\phi_1$ equals the flux $2\phi_3$, the starting current will be approximately one-half of the maximum starting current, and the starting torque will be approximately one-quarter of the maximum starting torque $T_1$. Under these conditions it is noted from FIG. 3 that a typical load curve $L_1$ intersects the reduced speed-torque-curve $T_2$ at $RPM_2$, and that the said load curve $L_1$ intersects the maximum torque-curve $T_1$ at $RPM_1$ when the magnetic rods $2r$ are completely withdrawn from their channelways in the stator.

Figure 4:
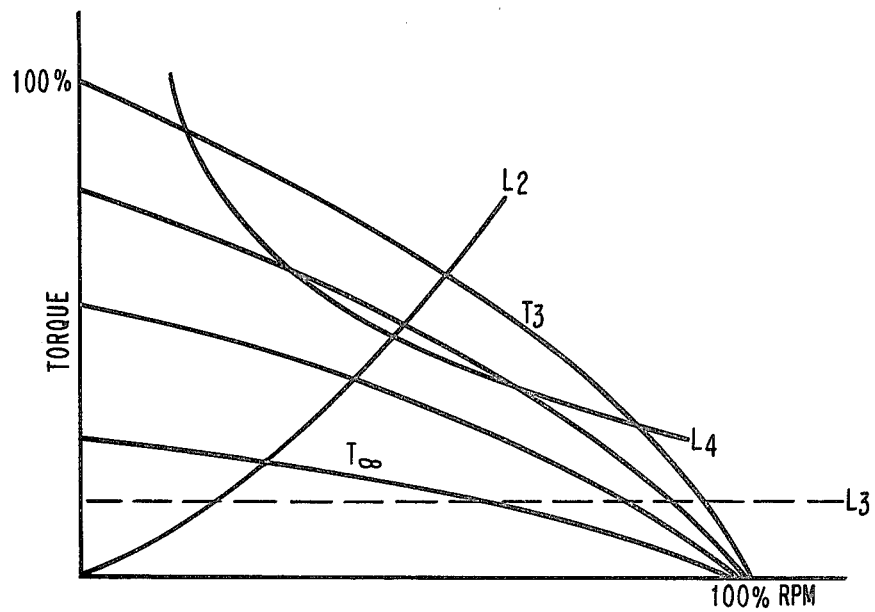
FIG. 4 graphically illustrates the relationship between the torque and r.p.m. of an A.C. motor which embodies the teachings of the present invention.

FIG. 4 shows that with the magnetic control rods of FIG. 2 withdrawn from the stator, and with $2\phi_1$ at maximum, a high slip motor will generate a speed-torque curve similar to $T_3$. By inserting the magnetic control rods longitudinally into slots $2m$ FIG. 2 an infinite family of speed-torque curves would be generated from $T_3$ to $T\infty$. With a load curve similar to $L_2$ the insertion of the magnetic control rods will also generate an infinite variety of running speeds depending on where the load curve intersects the corresponding torque curve. The same would be true of loads similar to $L_3$ and $L_4$.

The configuration of the magentic torque-control rods could be any shape as long as they fill their respective channelways $2m$. As earlier noted, it is important to have close physical contact between the adjacent surfaces of the magnetic rods and channelways $2m$ FIG. 2. These magnetic rods may be solid or laminated similar to the stator. The size of the inner channelway $2m$ will be dependent on the rotor output torque range requirements. The stator is wound in a conventional manner with coils inserted through openings $2h_2$, $2hm$, and $2h_1$. Openings $2h_1$ and $2h_2$ will be sized in accordance with conventional motor design practice. Dimension $2hm$ FIG. 2 will be sized according to magnetic control rods selected.

The length and number of the magnetic control rods is contingent upon degree of torque variations required. Maximum usable rod length would be insertion to the total length of the stator, and the number of magnetic control rods would normally be the same as the number of stator slots, but this again is optional depending on range of desired control.

Figure 5:
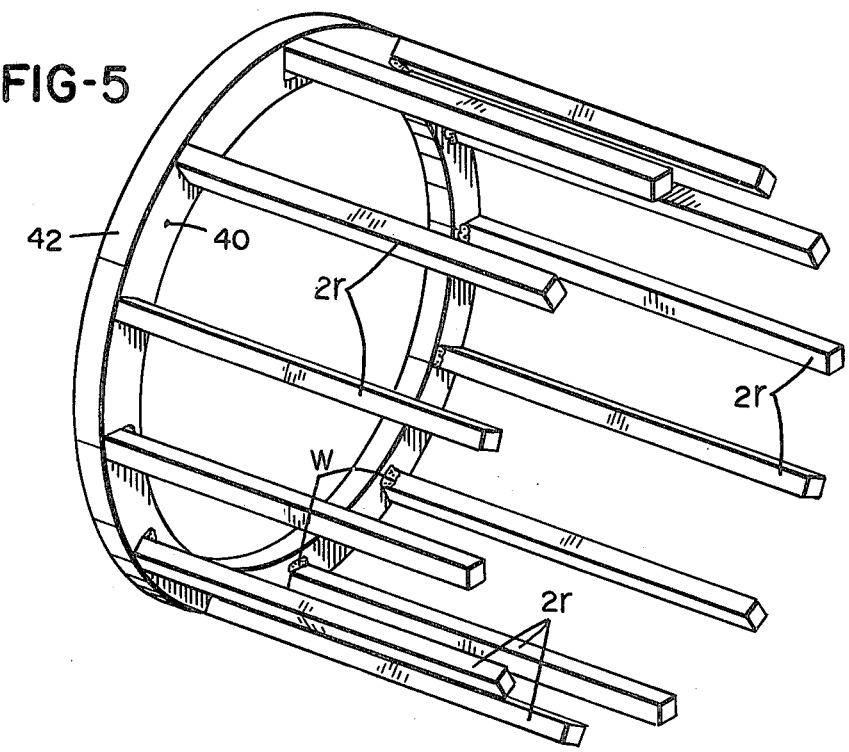
FIG. 5 is a perspective view illustrating the torque-control-rods and the manner in which they are anchored to a common mounting-control ring.

As best illustrated in FIG. 5 one end of each of the control rods $2r$ are fixedly secured to the inner planar surface 40 of a common mounting-control ring 42 such as, by way of example, welding W, or the like. Each of the rods are disposed in exact parallel axial alignment whereby to be slideably received into corresponding inner channelways $2m$ of the stator.

Endwise axial movement may be imparted to ring 42 and rods $2r$ by any suitable means, such as, by way of example, a jackscrew J which threadably engages member 50 which spanningly engages the free outer ends of a pair of actuator shafts 52 whose opposite ends are suitably anchored to the mounting control ring 42.

One end of a conventional motor housing 60 may be extended by removing the conventional bell cap and replacing it with a cup-shaped housing element 61 having side walls 62 and an end wall 64, wherein the inner surface of the said end wall is spaced from the adjacent end of housing 60 by a dimension or distance to freely accommodate the position of ring 42 when the rods have been fully retracted from their channelways $2m$ of the stator.

End wall 64 may be provided with an inwardly projecting boss 66 in which a bearing 68 in which the end of the rotor shaft 30 is journaled.

One end of the jackscrew, which threadably engages the internally threaded bore 54 of a strut member 50, may be rotatably secured to said member by an opening in the center of a plate 56 through which reduced shank 57 of the jackscrew projects, the outer end of said shank being engaged by a washer 58 which is anchored to the shank by means of a set screw 59. The plate 56 may be securely though releaseably fastened to rear wall 64 as at 69.

The opposite end of the jack shaft may be engaged by a handle K, whereby rotary motion imparted to the jack shaft is translated into endwise axial movement of the magnetic torque-control rods $2r$.

The subject invention is ideally suited for use with both single phase and polyphase A.C. motors with conventional stator windings modified to include channelways such as 2m for the reception of torque-control rods 2r.

Rods 2r may, in some instances, be introduced into the conventional stator slots S, as in FIG. 1, in those instances where the windings S' therein do not completely fill slots S to provide an open space beneath the windings into which the rods may be inserted. However, in each instance it is imperative that the rods are disposed between the windings as S' of FIG. 1 or 2S' of FIG. 2 and the air gap between the slots or channelways in which the rods are received and the air gap c or 2c, respectively, between the adjacent peripheral surfaces of the stator and rotor.

In some cases it may be desirable to provide a control rod for each of the stator slots, whereas in other instances rods may be associated with alternate or every third slot.

It should be understood that the inventive concept of this application is not limited to any particular means for imparting endwise axial movement to the control rods 2r and that the means illustrated in FIG. 5 merely represent one type of means which may be utilized. The desired movement to said rods can be manual, pneumatic, hydraulic, electromechanical, or they may be activated statically or dynamically by close loop feedback transducer.

It should likewise be understood that the particular shape of the elongate control rod-receptive open spaces or channelways of the stator slots and the complimentary shape of the control rods need not be rectangular as illustrated in the figures, but may be of any one of a plurality of other shapes.

What is claimed is:

1. An alternating current motor of both single and polyphase types which include a rotor, a stator, and an air gap between adjacent peripheral surfaces of the rotor and stator which comprises:
    a plurality of radially disposed, laterally spaced, elongate slots in the stator wherein each slot terminates in an inner air gap which is in open communication with the air gap between the rotor and stator;
    a plurality of windings disposed in each stator slot so arranged as to provide an elongate open space or channelway between the windings and the said inner air gap;
    a plurality of elongate, magnetic control rods slideably receivable in the said elongate open space or channelway of a stator slot; and
    means imparting selective, uniform, simultaneous, endwise movement to said rods between fully advanced and retracted positions relative to their respective open spaces or channelways of the stator slots for changing the paths and intensity of the stator flux enroute to the rotor.

2. An alternating current motor as called for in claim 1, wherein a torque-control rod is provided for each of the stator slots.

3. An alternating current motor as called for in claim 1, wherein the torque-control rods are provided for selected stator slots less than the total number of said slots.

4. An alternating current motor as called for in claim 1, wherein each of said stator slots includes an inner and an outer channelway and a pair of air gaps, one gap extending between and interconnecting said channelways, the other air gap extending between and connecting the inner channelway to the inner periphery of the stator, and wherein the stator windings are disposed entirely within the outer channelways entirely beyond the said one air gap.

5. An alternating current motor as called for in claim 1, wherein one end of each of said torque control rods is rigidly secured to and carried by an annular ring and wherein means operable from a location external of the motor housing imparts axial movement to said ring for selectively advancing or retracting the control rods relative to their respective open spaces or channelways of the stator slots for controlling and varying the torque control output by shortcircuiting more or less of the flux flowing between the stator and rotor.

6. An alternating current motor as called for in claim 1, which includes a motor housing having bearings at opposite ends thereof in which opposite ends of a shaft to which the rotor is mounted are journaled and wherein one end of said motor frame is spaced axially outwardly from an end of the rotor and stator whereby to provide a space interiorly of the motor housing which is dimensioned to house the torque control rods throughout their entire axial movement between fully advanced and retracted positions relative to the slots of the stator.

7. In an alternating current motor as called for in claim 5 the provision of at least two control-ring actuator rods, one end of each of which are securely anchored to said ring, said rods being of a length whereby to project outwardly through appertures provided in an end wall of the housing and through which said rods slideably project;
    a strut secured to, carried by, and spanning the outermost ends of said actuating rods and;
    means for moving said strut toward and from the outer end of the motor housing incident to imparting endwise axial movement to the torque control rods.

8. An alternating current motor as called for in claim 7, wherein the said strut is provided with an internally threaded bore for cooperation with an externally threaded jack shaft engaging said bore, said shaft having an inner end which is rotatably journaled relative to the outer end of said motor housing and means for rotating said shaft for imparting axial movement to said strut.

9. A method of controlling and selectively varying the torque output of the rotor of an A.C. motor between maximum and minimum values, wherein said motor includes a housing, a rotor, and a stator having a plurality of elongate, radially disposed, laterally spaced slots each of which are provided with a plurality of windings, and wherein each slot includes an inner terminal end which is adjacent to but spaced outwardly from the inner periphery of the stator and which terminal end is in open communication with said stator periphery via an inner air gap, which method comprises the steps of:
    providing an elongate open space or channelway in each slot below the windings therein and above the inner air gap thereof;
    simultaneously introducing a plurality of elongate, magnetic bars into the elongate open spaces or channelways of certain of said stator slots for selectively changing the normal flux flow pattern from the stator to the rotor such as would occur but for the presence of said bars in said open spaces or channelways.

10. A method as called for in claim 9, which includes the step of selectively advancing and retracting the magnetic bars during rotation of the rotor, from a location external of the motor housing, for correlating the overall flux flow pattern from the stator to the rotor to provide the desired torque within the limits of the motor rating to the rotor.

11. A method as called for in claim 9, wherein the starting current applied to the rotor is a function of the number of magnetic bars used and the relative depth of insertion of the magnetic bars into the stator.

12. A method as called for in claim 9, wherein the output speed of the rotor is a function of the number of magnetic bars used and the relative depth by which they are inserted into the stator.

* * * * *